PHONOGRAPH CIRCUIT HAVING SHOCK PREVENTION MEANS
Filed July 9, 1948
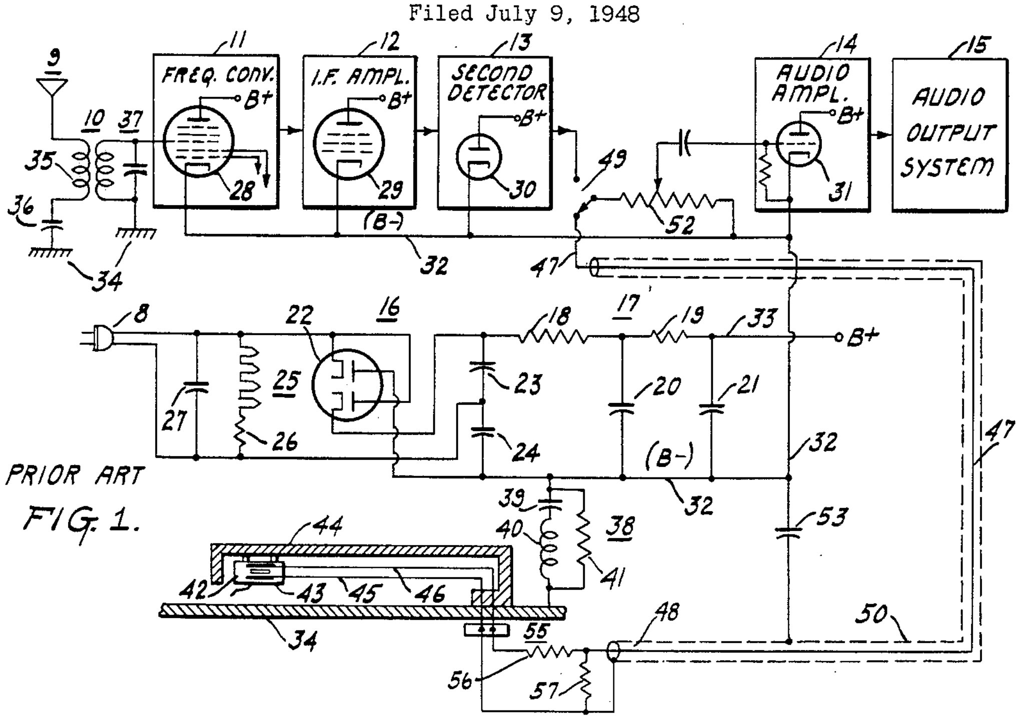
PRIOR ART FIG. 1.
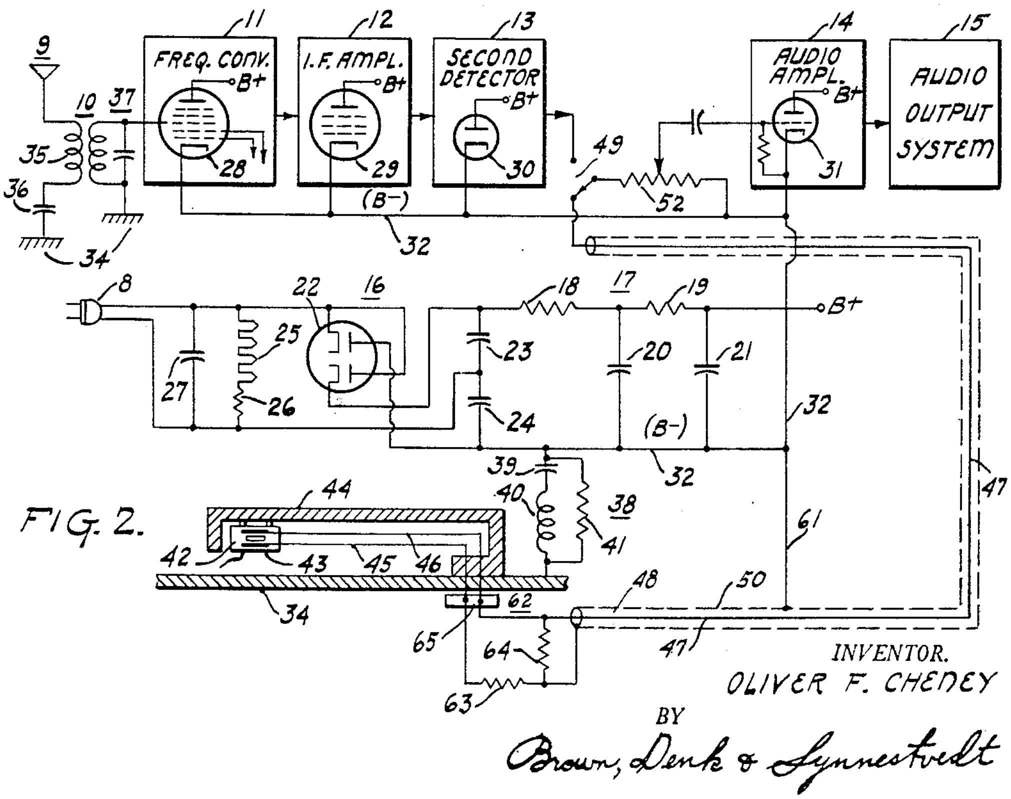
FIG. 2.
INVENTOR.
OLIVER F. CHENEY
BY
Brown, Denk & Synnestvedt
AGENTS Patented July 3, 1951 2,558,821

UNITED STATES PATENT OFFICE 2,558,821

PHONOGRAPH CIRCUIT HAVING SHOCK PREVENTION MEANS

Oliver F. Cheney, Philadelphia, Pa., assignor to Philco Corporation, Philadelphia, Pa., a corporation of Pennsylvania Application July 9, 1948, Serial No. 37,742

5 Claims. (Cl. 179—100.11)

The invention herein described and claimed relates to phonographs, particularly radio-phonograph combinations, of the types which are adapted to obtain their operating power from supply mains without the use of an interposed transformer. While the invention is applicable to phonographs having an audio amplifier stage but no radio-receiver stages, the invention is particularly adapted to radio-phonographs and it will be convenient to describe the invention in the latter environment.

In many alternating-current radio-phonograph combinations, a transformer is, of course, employed. Where employed, the transformer serves the purpose, not only of supplying the desired voltage to the rectifier-filter circuit, but also of isolating the vacuum-tube circuits from the A.-C. mains. Hence, if and when an accidental short circuit occurs within the receiver, the receiver circuits are in an isolated condition, so far as the supply mains are concerned, and a flow of large amperage current does not occur within the apparatus. Person and property are therefore not threatened with serious injury.

In many types of radio-phonograph combination, however, no line transformer is employed and the power-supply mains are connected directly to the vacuum-tube circuits by way of elements whose impedance to supply-line frequencies is very low, e. g., of the order of 1000 ohms or less. Included among the types of radio-phonographs which employ no transformer, are direct-current apparatus, transformerless alternating-current apparatus, and direct-current/alternating-current apparatus, the latter being operable from either D.-C. or A.-C. supply mains.

In such apparatus, employing no line transformer, it is dangerous to life and property to connect the vacuum-tube circuits conductively to the chassis of the apparatus since the line plug, in at least one, and in some cases both, of its two possible socket positions would connect the full, or almost full, line voltage to the chassis. Nevertheless, from a wiring standpoint, it is desirable to use the chassis as a common return for certain currents, as for example, for the radio-frequency and intermediate-frequency currents of a radio-phonograph. It is therefore common practice, in transformerless types of apparatus, to connect the radio-frequency and intermediate-frequency circuits capacitively to the chassis. The value of the capacitance employed is necessarily a compromise between opposing considerations, for the connection must provide a path of relatively low impedance to radio-frequency and/or intermediate-frequency currents, while for direct currents or for currents of supply-line frequency (50–60 cycles per second), the path provided must offer a sufficiently high impedance to prevent a flow of line current of such magnitude as to be dangerous to life and property. The requirements in this regard are established in the United States by the Underwriters' Laboratories, Inc.

As presently defined by Underwriters' Laboratories, Inc., in the "Standard for Power-Operated Radio Receiving Appliances," sixth edition, November, 1942, shock hazard is considered to exist at an exposed live part if the open circuit potential is more than 25 volts and the current, with a 1500 ohm load, is more than 5 milliamperes. A live part is considered to be exposed if it is subject to handling in normal use, not including servicing. A phonograph pick-up arm is within this definition and is consequently considered to be an exposed live part.

In prior art transformerless radio-phonographs, the requirements of the Underwriters' Laboratories as to shock hazard have been met by constructions which entailed a sacrifice of quality of performance.

The present invention provides a transformerless radio-phonograph combination which, while meeting the underwriters' requirements as to shock hazard, provides improved quality of performance. The improvement in performance includes a substantial reduction in objectionable A.-C. hum, i. e., a substantial reduction in the audible hum of supply-line frequency, or of frequencies related harmonically thereto, which is heard in the background of a received radio program or phonograph-record reproduction.

It is an object of this invention to provide an improvement in transformerless phonographs and radio-phonograph combinations.

It is another object of this invention to provide an improved transformerless phonograph or radio-phonograph combination which, while meeting the requirements of the Underwriters' Laboratories, Inc., as to shock hazard, reproduces substantially less A.-C. hum than do similar prior art apparatus.

These and other objects, features and advantages of the present invention will become clear from a consideration of the following detailed description and of the accompanying drawings wherein:

Figure 1 is a representation, partly schematic, partly diagrammatic, of a transformerless radio-phonograph combination of the prior art; and Figure 2 illustrates a transformerless radio-phonograph combination which includes the improvement provided by the present invention.

Referring now to Figure 1, there is shown a transformerless A.-C. superheterodyne radio-phonograph, employing the means of the prior art, and comprising an antenna 9, an antenna transformer 10, a combined first detector-oscillator or frequency converter 11, an intermediate-frequency amplifier 12, a combined second detector and automatic-volume-control 13, an audio amplifier 14, and an audio output system 15.

The power-supply means shown in Figure 1 comprises a line plug 8, an alternating-current rectifier and voltage-doubling circuit 16, and a filter system 17. Filter system 17 includes series resistances 18 and 19 and shunt capacitors 20 and 21. Voltage-doubling circuit 16 is conventional and includes a double-diode vacuum tube 22 and capacitors 23 and 24. Capacitors 23 and 24 are charged on alternate half cycles of supply-line voltage, and are so arranged that the voltages developed thereacross are additive. The capacitors are ordinarily of the electrolytic type and of high capacity, e. g. 15 microfarads or more. Cathode heaters 25 of the various vacuum tubes are serially connected across the supply mains, and one or more ballast resistors 26 may be included in series therewith, if necessary or desired. A small capacitor 27 is ordinarily connected across the mains for the purpose of bypassing radio-frequency currents.

It will be observed that in the transformerless a.-c. radio-phonograph shown in Figure 1, low-impedance connections obtain between the common cathode conductor 32 (B—) and the high potential, i. e., ungrounded, side of the supply mains. For, when the upper prong of line-plug 8 is connected to the ungrounded side of the supply mains, there is a low-impedance conductive connection, on the negative half-cycles of supply-mains voltage, between the B— conductor 32 and the high potential side of the supply mains, by way of the upper diode of tube 22. And, when the lower prong of line-plug 8 is connected to the ungrounded side of the supply mains, there is a low impedance capacitive connection, between the B— conductor 32 and the high potential side of the supply mains, by way of capacitor 24.

In modern radio receivers and radio-phonograph combinations, it is common practice to mount various components on a metal chassis or housing represented generally as 34. The chassis also serves as an electrically conductive member having a common potential to which certain of the radio receiver circuits may be connected. Thus, in Figure 1 of the drawing, the primary winding 35 of the antenna transformer 10 has been returned, through capacitor 36, to the chassis 34; and the R.-F. tank circuit 37, on the secondary side of the antenna transformer 10, is also connected directly to the chassis 34.

Since, as has already been indicated, one side of the electric supply mains is ordinarily grounded, and since the B— conductor 32 is connected, by way of a low impedance element, to the ungrounded or high potential side of the mains, it would be hazardous to connect the B— conductor 32 directly to the chassis 34, for it would then be possible for substantially the full mains voltage to exist between the chassis and ground. On the other hand, in order to maintain stability and efficiency of operation, with respect to the radio-phonograph apparatus, it is necessary that a connection be provided between certain of the apparatus circuits and the chassis. Such connection is required to offer low impedance to the radio-frequency currents extant in the apparatus, but high impedance to currents of supply-line frequency. While the coupling may comprise a capacitor of suitable size connected between the B— conductor 32 and the chassis 34, it is preferable, as shown in the patent to Albright, No. 2,261,203, issued November 4, 1941, and assigned to the assignee of the present invention, to employ a frequency-discriminating network which may comprise a number of dissimilar reactive elements arranged to provide a low impedance path for the various high frequency currents employed in the apparatus while offering high impedance to low frequency and direct currents. Such a frequency-discriminating network is represented in Figure 1 by network 38 comprising serially-connected capacitor 39 and choke 40 and shunt resistor 41. Resistor 41 is of large value and serves to provide a return, from chassis to B—, for D.-C. leakage currents.

The arrangement shown in the Albright patent, referred to above, meets, in a very satisfactory manner, the shock hazard requirements of transformerless radio receivers without impairment to the quality of performance. But transformerless radio-phonographs involve a complication, not present in radio receivers, which prevents the frequency-discriminating network of the Albright patent from being a complete solution to the shock hazard problem, so far as radio-phonographs are concerned.

As shown diagrammatically in Figure 1, a conventional radio-phonograph combination includes a phonograph pickup element 42 which is ordinarily enclosed in a metal housing 43; and the housing 43 is ordinarily supported in depending position from a metal tone arm 44 mounted upon the chassis 34. The phonograph pickup 42 illustrated in Figure 1 comprises a conventional, high impedance crystal element.

The upper electrode of the crystal element 42 is connected in conventional manner, by way of lead 46, resistor 56 of equalizing network 55, conductor 47, radio-phono switch 48 (upper right portion of Figure 1), and volume control 52, to the control grid of audio amplifier tube 31. It is ordinarily necessary, or at least desirable, to shield conductor 47 from the ambient electrostatic fields established by the power supply lines, particularly by the supply lines located within the radio-phonograph cabinet, as otherwise a voltage of supply-line frequency, and of substantial magnitude, would appear on the control grid of tube 31, and an intolerable amount of A.-C. hum would be reproduced in the audio output system 15. In the arrangement shown in Figure 1, the necessary electrostatic shielding for conductor 47 is provided by employing a suitable shielded line 48, the inner conductor of which, being connected to pickup-conductor 46, constitutes a continuation thereof.

The lower electrode of crystal pickup 42 is returned to the cathode of audio amplifier tube 31 by way of conductor 45, the outer conductor or shield portion 50 of the coaxial line 48, capacitor 53, and the common B— conductor 32.

Excluding shock hazard considerations, capacitor 53 is desirably of relatively large size since its principal function is to return to the B— conductor 32 voltages of supply-line frequency derived from the ambient electrostatic fields and developed in the outer conductor 50 of shielded line 48. However, if capacitor 53 were large, a shock-hazard condition would obtain if the lower electrode of pickup 42 were to become shorted to the housing 43. For then, the impedance between the tone arm 44 and the B— conductor 32 would be lowered by the establishment of an additional shunt path which includes capacitor 53. A current of shock-hazard magnitude could then flow from the high potential, i. e., ungrounded, side of the supply mains through the low impedance of tube 22 or of capacitor 24, depending upon the socket position of line-plug 8, to the B— conductor 32 through the parallel paths, to be described, interconnecting the B— conductor 32 and the tone arm 44, and then, assuming the operator to be in contact with tone arm 44, through the operator to ground. One of the parallel paths referred to interconects the B— conductor 32 with tone arm 44 only when a short circuit occurs, as at the lower electrode of pickup 42. This path comprises capacitor 53, the outer conductor 59 of coaxial line 48, conductor 45, the lower electrode of pickup 42, the assumed short circuit, housing 43 and tone arm 44. The other parallel path, interconnects the B— conductor with chassis, and hence with tone arm 44, entirely independently of the occurrence of a short circuit. This path comprises network 38, chassis 34 and tone arm 44.

The occurrence of a short circuit between conductor 45 or the lower electrode of crystal pickup 42 and housing 43 is required to be assumed, under the Underwriters' regulations, for the dimensions of the spacings are small and experience has shown short circuits to occur there rather frequently. In prior art radio-phonograph circuits, the situation has been met, satisfactorily so far as shock hazard considerations are concerned, but unsatisfactorily so far as radio receiver performance is concerned, by selecting values for network 38 and for capacitor 53 such that the combined impedance of the parallel paths at supply-line frequency is sufficiently high to prevent the flow of currents of shock hazard magnitude when a short circuit occurs. This treatment of the problem requires that the impedance of network 38 be substantially higher in radio-phonographs than in radio receivers, since in radio-phonographs the possibility of having capacitor 53 in shunt with network 38 must be assumed. In radio receivers this situation does not exist, there being no tone arm to be contacted by the operator and no phonograph pickup to be shorted to its housing.

As has been indicated, the arrangement employed by the prior art and illustrated in Figure 1, is unsatisfactory with respect to performance, particularly the performance of the radio-receiver portion of the radio-phonograph combination, one reason being that the impedance of the return path for the R.-F. and I.-F. currents from chassis to cathode is too high to permit the required gains to be obtained. The situation is complicated by the fact that, while for shock hazard considerations capacitor 53 must be assumed to complete a path between the B— conductor 32 and the chassis 34 and to be in shunt with network 38, such a shunt path will ordinarily not exist, since ordinarily there will be no short circuit between pickup 42 and housing 43.

Stated another way, network 38 will ordinarily constitute the only connection between the B— conductor 32 and chassis 34. Nevertheless, each of the networks 38 and 53 individually must have a sufficiently high impedance to permit, in the event of a short circuit at pickup 42, their joint presence between chassis 34 and conductor 32 without establishing a shock hazard condition. To meet this requirement, the impedance of capacitor 53 at supply-line frequencies is so high that an objectionable A.-C. hum is inevitable in the audio output system.

In accordance with the present invention, A.-C. hum is reduced to negligible proportions by means of the circuit shown in Figure 2. The circuit of Figure 2 is similar in most respects to the circuit of Figure 1 but there are two important differences. The first of these is that equalizing network 55 is replaced with network 62. The second is that capacitor 53 is replaced with a low impedance direct connection 61.

The omission of capacitor 53 and the employment in lieu thereof, of a conductive connection 61, having low impedance at supply-line as well as at audio frequencies, is made possible by network 62 which, in the illustrated embodiment, performs not only the functions of the prior art equalizing network 55 but in addition thereto provides the required protection against shock hazard which in the prior art circuits is afforded by capacitor 53.

Referring now more particularly to network 62, it will be observed that network 62 is similar to the prior art equalizing network 55 in that each network is comprised of a series resistance and a shunt resistance. Moreover, the series and shunt resistances 63, 64 of the new network 62 may, in many cases, have substantially the same values as the corresponding resistances 56, 57 of network 55. The important difference lies in the location of the series resistance. In prior art equalizing networks of the type being discussed, the series resistance has, to the best of my knowledge, always been connected between the high-potential electrode of the phonograph pickup and the grid of the audio amplifier tube.

As distinguished from the above, series resistor 63 of the new network 62 is connected between the low-potential electrode of the phonograph pickup 42 and the shield 59 of shielded line 48. As a result of the relocation of the series resistance, the new network 62 is capable of performing, and in the illustrated embodiment does perform, three functions. The first two of these functions are also performed by the prior art equalizing network 55. The third, however, is an important additional function, not performed by the prior art network 55.

The three functions performed by network 62 are as follows: First, network 62 effects tone compensation in a desired and known manner, the tone compensation effected in any particular case being a function of the relative values of the series and shunt resistances 63, 64. Secondly, network 62 serves as a voltage divider to step down the output of the crystal pickup 42 so that the signals applied to the grid of the audio amplifier 14 may be of the same general order of magnitude as the signals applied thereto from the second detector 13. And thirdly, network 62 provides adequate protection against the establishment of a shock-hazard condition, for series resistor 63 is of sufficiently large magnitude to prevent a flow of current of shock-hazard proportions in the event a short circuit occurs between the lower electrode of crystal pickup 42 and housing 43.

As has been previously indicated, if a short circuit should occur between the lower electrode of pickup 42 and housing 43, a path would be completed between chassis 34 and the B— conductor 32, in shunt with network 38, and would comprise tone arm 44, housing 43, the short circuit, the lower electrode of crystal pickup 42, conductor 45, resistor 63, shield 59 of shielded line 48, and the low impedance connection 61. In order to offer the necessary high resistance to currents of supply-line frequency, resistors 63 will ordinarily need to be of no higher resistance than series resistor 56 employed in prior art circuits. In a typical case, resistor 63 may be of the order of 100,000 ohms.

It will now be readily understood that since resistor 63 is so located in the circuit, and is of such high resistance, as to prevent a shock-hazard condition from obtaining in the event a short circuit occurs at the phonograph pickup, it is unnecessary to insert a shock-preventing impedance between the shield 50 and the B— conductor 32. Therefore, in the improved circuit of Figure 2, capacitor 53 is omitted and shield 50 is joined to the B— conductor 32 by the low impedance conductive conection 61. As a consequence, the appreciable A.-C. hum voltage heretofore developed across capacitor 53 is entirely eliminated.

It will be understood that the shunt resistance element 64 may, if desired, be placed directly across the crystal pickup 42, for example, directly across the terminals 65. As a matter of fact, shunt resistor 64 is not a necessary element of the present invention and may be omitted from the circuit, as for example, where no tone compensation is desired, or where the volume control 52 is relied upon to provide the requisite shunt resistance.

In the claims the structure employed to energize the phonograph or associated audio amplifier is defined as low impedance means for energizing the tubes from electric supply mains, said low impedance means including a conductive connection between the supply mains and the common cathode conductor or associated audio amplifier. This definition is intended to limit the environment of my invention to a type of phonograph apparatus in which no line transformer is employed, commonly referred to as a transformerless type of phonograph apparatus.

Having described my invention, I claim:

1. In a radio phonograph comprising: a plurality of vacuum tubes having at least anode, cathode and control electrodes; a phonograph pickup; means coupling said pickup to the control electrode of one of said tubes, said means including a first conductor, a second conductor and a shield for at least a portion of said first conductor; a conductor common to the cathode circuits of said tubes; low impedance means for energizing said tubes from electric supply mains, said means including a conductive connection between said supply mains and said common cathode conductor; an electrically conductive chassis upon which various components of said radio-phonograph are mounted; and a connection between said common cathode conductor and said chassis, said connection having relatively low impedance to currents of radio and intermediate frequency and relatively high impedance to currents of supply-mains frequency, said impedance at supply-mains frequency being sufficient to prevent a flow of current of shock-hazard proportion between said common cathode conductor and said chassis in the event that supply-mains voltage is impressed therebetween; the improvement which comprises the provision of a connection between said common cathode conductor and said shield, said connection offering sufficiently low impedance to supply-mains frequency to prevent the development across said connection of voltages of appreciable magnitude at supply-mains frequency; and a resistance connected between said phonograph pickup and said shield, said resistance being sufficiently high to prevent a flow of current of shock-hazard proportion therethrough in the event that supply-line voltage is impressed thereacross.

2. In a radio phonograph comprising: a plurality of vacuum tubes having at least anode, cathode and control electrodes; a phonograph pickup; means coupling said pickup to the control electrode of one of said tubes, said means including a first conductor, a second conductor and a shield for at least a portion of said first conductor; a conductor common to the cathode circuits of said tubes; low impedance means for energizing said tubes from electric supply mains, said means including a conductive connection between said supply mains and said common cathode conductor; an electrically conductive chassis upon which various components of said radio-phonograph are mounted; and a connection between said common cathode conductor and said chassis, said connection having relatively low impedance to currents of radio and intermediate frequency and relatively high impedance to currents of supply-mains frequency, said impedance at supply-mains frequency being sufficient to prevent a flow of current of shock-hazard proportion between said common cathode conductor and said chassis in the event that supply-mains voltage is impressed therebetween; the improvement which comprises the provision of a low-resistance conductive connection between said common cathode conductor and said shield; and a resistance connected in series with said second conductor between said phonograph pickup and said shield, said resistance being sufficiently high to prevent a flow of current of shock-hazard proportion therethrough in the event that supply-line voltage is impressed thereacross.

3. In a radio phonograph comprising: a plurality of vacuum tubes having at least anode, cathode and control electrodes; a crystal pickup; means coupling said pickup to the control electrode of one of said tubes, said means including a first conductor, a second conductor and a shield for at least a portion of said first conductor; a conductor common to the cathode circuits of said tubes; low impedance means for energizing said tubes from electric supply mains, said means including a conductive connection between said supply mains and said common cathode conductor; an electrically conductive chassis upon which various components of said radio-phonograph are mounted; and a connection between said common cathode conductor and said chassis, said connection having relatively low impedance to currents of radio and intermediate frequency and relatively high impedance to currents of supply-mains frequency, said impedance at supply-mains frequency being sufficient to prevent a flow of current of shock-hazard proportion between said common cathode conductor and said chassis in the event that supply-mains voltage is impressed therebetween; the improvement which comprises the provision of a connection between said common cathode conductor and said shield, said connection offering sufficiently low impedance to supply-mains frequency to prevent the development across said connection of voltages of appreciable magnitude at supply-mains frequency; and a resistance connected in series with said second conductor between said crystal pickup and said shield, said resistance being sufficiently high to prevent a flow of current of shock-hazard proportion therethrough in the event that supply-line voltage is impressed thereacross.

4. In an electric phonograph having at least one stage of audio amplification; a tube having at least anode, cathode and control electrodes; a phonograph pickup; means coupling said pickup to said tube, said means including a first conductor, a second conductor and a shield for at least a portion of said first conductor; low impedance means for energizing said tube from electric supply mains, said means including a cathode conductor and a conductive connection between said cathode conductor and said supply mains; an electrically conductive chassis upon which various components of said phonograph are mounted; and a connection between said cathode conductor and said chassis, the impedance of said connection at most audio frequencies being low relative to the impedance of said phonograph pickup, the impedance of said connection at supply-mains frequency being sufficiently high to prevent the flow of current of shock-hazard proportion between said cathode conductor and said chassis in the event that supply-mains voltage is impressed therebetween; the improvement which comprises the provision of a connection between said cathode conductor and said shield, said connection offering sufficiently low impedance to supply-mains frequency to prevent the development across said connection of voltages of appreciable magnitude at supply-mains frequency; and a resistance connected in series with said second conductor between said phonograph pickup and said shield, said resistance being sufficiently high to prevent a flow of current of shock-hazard proportion therethrough in the event that supply-line voltage is impressed thereacross.

5. In an electrical record player subject to be operatively connected to an associated audio amplifier which is energized from electric supply mains through low impedance means, said means including a conductive connection between said supply mains and said amplifier; a phonograph pickup; and means for connecting said pickup to the input circuit of said associated audio amplifier, said means including a first conductor for connecting one terminal of said pickup to a first input terminal of said associated audio amplifier, a shield for at least a portion of said first conductor, means for connecting said shield to a second input terminal of said associated audio amplifier, a second conductor connected to the other terminal of said pickup, and a resistance connecting said second conductor to said shield, said resistance being sufficiently large to prevent a flow of current of shock-hazard proportion therethrough in the event that supply-line voltage is impressed thereacross.

OLIVER F. CHENEY.

REFERENCES CITED

The following references are of record in the file of this patent:

UNITED STATES PATENTS

| Number | Name | Date |
|---|---|---|
| 2,283,728 | Gage | May 19, 1942 |